March 8, 1955       E. E. HUPP       2,703,631
BREAKAWAY VALVE FOR TRACTOR-TRAILER COMBINATION
Filed Feb. 24, 1951
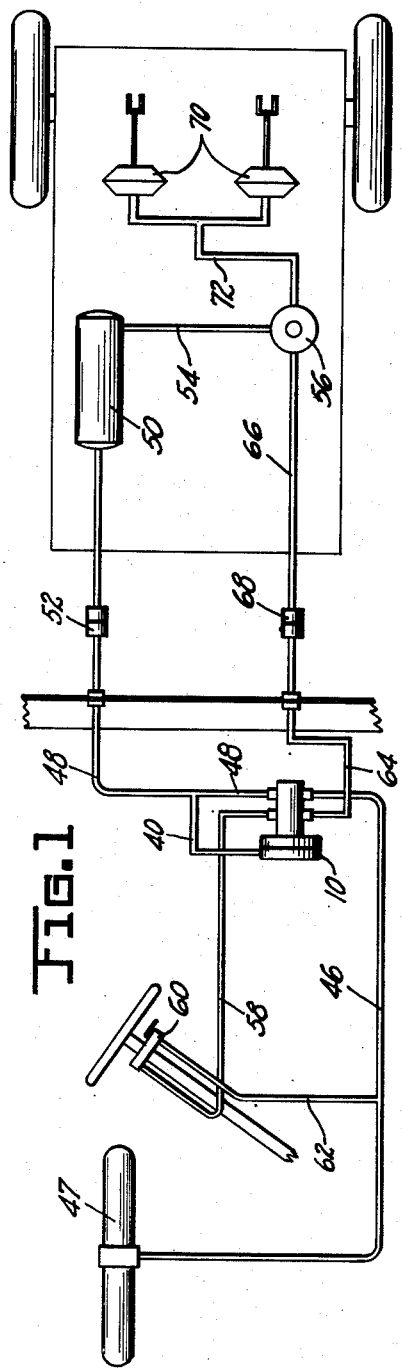
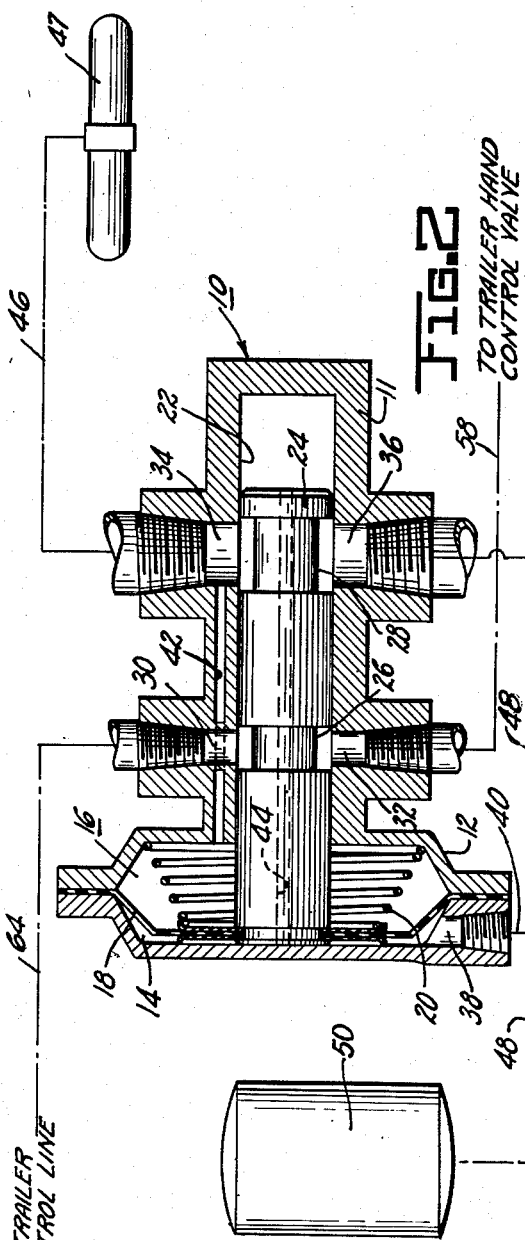
INVENTOR.
EDWARD E. HUPP
BY
ATTORNEY

United States Patent Office 2,703,631
Patented Mar. 8, 1955

2,703,631

BREAKAWAY VALVE FOR TRACTOR-TRAILER COMBINATION

Edward E. Hupp, South Bend, Ind., assignor to Bendix Aviation Corporation, South Bend, Ind., a corporation of Delaware Application February 24, 1951, Serial No. 212,645

5 Claims. (Cl. 188—3)

The present invention relates to a valve usable in a tractor-trailer brake system, and more particularly to an automatic shut-off valve arranged to preserve a subatmospheric pressure in the tractor brake system when the tractor and trailer are unhitched.

In brake systems for tractor-trailer combinations which utilize subatmospheric pressure as the power medium, it is necessary to convey this pressure between the tractor and trailer. The pressure conveying means is usually a hose or pipe which is communicated with a suitable source of vacuum on the tractor (usually the intake manifold of the tractor engine) and a vacuum reservoir on the trailer. Power units for operating the brakes are mounted on both the tractor and trailer and are connected, in a suitable manner, into the vacuum system. When the tractor and trailer are disconnected, it is obvious that the pressure conveying lines must be severed. Such severance exposes the parted line ends to air at atmospheric pressure which tends to fill the vacuum system and destroy any vacuum condition therein. Therefore, if the vacuum system of the tractor is to be relied upon at all times for tractor braking, it is necessary to provide some means for sealing the tractor-end of the conveying line when the tractor and trailer are separated.

It is, therefore, an object of the present invention to provide a valve, mountable on the tractor, which will automatically prevent the communication of atmosphere into the tractor vacuum system upon severance of the trailer from the tractor.

It is another object to provide a brake system for a tractor-trailer combination, which will automatically preserve the proper system condition for tractor braking when the trailer is disconnected from the tractor.

Other objects will become apparent as the description proceeds.

In the drawing:

Figure 1 is a diagrammatic illustration of a tractor-trailer brake system embodying the present invention; and Figure 2 is a sectional view of the breakaway valve which is an illustrative embodiment of the valve invention incorporated in Figure 1.

Referring to the drawing, and more particularly to Figure 2, the breakaway closing valve 10 is shown as comprising a casing having a compartment 12 in one end thereof. This compartment is divided into two variable volume chambers 14 and 16 by flexible diaphragm 18 which has bearing thereon a frusto-conically shaped spring 20 which forces this diaphragm against the head wall of compartment 12. A cylindrical, uniform diameter bore 22 is formed in the right hand end of casing 11 and is finished to reciprocably receive valve piston 24 which is secured to diaphragm 18. Valve piston 24 is provided with a pair of axially spaced annular valve grooves 26 and 28 for a purpose to be explained hereafter. The right hand end of casing 11 is also provided with two ports 30 and 32 which are arranged to be selectively placed in communication with each other by means of the valve groove 26, and two other ports 34 and 36 similarly arranged to be selectively communicated with each other by means of the valve groove 28. Thus, it is seen that by reciprocating the valve piston 24, the valve grooves 26 and 28 will be alternately placed in and out of registry with their respective ports 30, 32 and 34, 36. The chamber 14 is provided with a vacuum port 38 which is communicated with inlet port 36 by means of a conduit 40 and a portion of a vacuum line 48. Chamber 16 is communicated with outlet port 34 by means of a relatively small conduit or passage 42. An axial passage 44 is provided through the valve piston 24 for a purpose which will become apparent hereafter.

It will now be explained how valve 10 is connected into a tractor-trailer brake system. The valve 10 is mounted in a suitable manner on the tractor, and its outlet port 34 is connected by means of a vacuum line connection 46 with a source of subatmospheric pressure on the tractor such as the intake manifold 47. The inlet port 36 of the valve 10 is connected by means of the aforementioned vacuum line connection 48 to the trailer reserve tank 50 by means of a detachable coupling 52. A line 54 feeds from the trailer reserve tank to a conventional automatic control valve 56 operable to control the trailer brakes. Port 32 of valve 10 is connected by means of a control line 58 to a hand control valve 60 mounted on the tractor, and a line 62 connects vacuum line 46 to this hand control valve 60. Port 30 of valve 10 is connected to the trailer valve 56 by means of control lines 64 and 66 which are detachably coupled together by means of the coupling 68. A pair of brake power cylinders 70 are fed through a branched line 72 by the trailer control valve 56.

With the tractor engine running, the vacuum developed by the intake manifold 47 is communicated to desired parts of the brake system through the valve 10 which, of course, must be opened to its illustrated position, and the same vacuum will prevail in chambers 14 and 16 by virtue of the conduit 40 and the passage 42. The diaphragm 18 being virtually submerged in vacuum no differential pressure prevails thereover which could overcome the force of the spring 20. Should the coupling 52 be either intentionally or accidentally separated, air at atmospheric pressure will immediately rush through the line 48 toward the breakaway valve 10. It is to be noted that this inrush of air will occur only while the vacuum is being developed in chamber 14 by the manifold 47, which, of course, means that the tractor engine must be running. This inrush of air is communicated to the conduit 40 of the valve 10 and enters chamber 14 thereby creating a sudden differential of pressure over the diaphragm 18 which forces this diaphragm and the valve piston 24 to the right. Communication between ports 30 and 32 and between ports 34 and 36 is thereby severed inasmuch as the respective valve grooves 26 and 28 are moved out of registry therewith. Thus, air at atmospheric pressure is prevented from being communicated to the intake manifold 47 which means that the operation of the tractor engine will not be inhibited.

The conduit 40 and that portion of the vacuum line 48 interconnecting the latter conduit with the port 36 are intentionally made of greater internal diameter than the bore of the passageway 42. When breakaway occurs, the air rushes through conduit 40 into chamber 14, and also tends to rush through the ports 36 and 34 and into chamber 16 by way of the passage 42. Inasmuch as the passage 42 is decidedly more restricted to the flow of this atmospheric pressure than is the conduit 40 and the vacuum line 48, it is obvious that a differential of pressure will be developed over diaphragm 18.

After the trailer has been decoupled from the tractor, and the tractor engine stopped, the pressure in the manifold 47 gradually changes until it reaches that of atmospheric pressure. This atmospheric pressure is communicated by means of line 46 and port 34 through passage 42 to chamber 16. When the pressures in chambers 14 and 16 become equal, the spring 20 naturally forces the diaphragm 18 and valve piston 24 to the left against the head of compartment 12. This brings ports 30 and 32, and ports 34 and 36, into communication.

Now, with the trailer coupled to the tractor, starting the tractor engine develops a vacuum in the intake manifold 47 which is communicated through the entire tractor and trailer brake system. Since the passage 42 is much smaller than the conduit 40, the chamber 14 will be exhausted more quickly than will the chamber 16. This is desirable and an intended result since the development of the differential of pressure over the diaphragm 18 by exhaustion of chamber 14 ahead of chamber 16 maintains the valve 24 in its opened position whereby the vacuum developed by the manifold 47 will be communicated completely through the trailer system. If the passage 42 were made of such size that chamber 16 would be exhausted prior to chamber 14, the pressure differential created over the diaphragm 18 would force the diaphragm and valve piston 24 to the right which would close off communication with the trailer. Thus, it is seen, that it is necessary for the passage 42, the conduit 40, and the portion of the vacuum conduit interconnecting the conduit 40 with the inlet port 36 to be so sized as to first allow the communication of air after breakaway more rapidly to chamber 14 than to chamber 16, and the establishment of a vacuum condition more rapidly in the chamber 14 than in chamber 16 after connection is reestablished.

While the passage 42 has been shown as constituting a small bore in the wall of casing 11, which by-passes the port 30, it will be obvious that other conduit expedients may be used so long as the flow of a given fluid pressure therethrough is sufficiently less than the flow of the same fluid through the conduit 40.

In the illustrative brake system of Figure 1, the hand control valve 60 is manipulated to operate the brake power cylinders 70 to apply the trailer brakes. Other types of trailer brake controls may be used without departing from the scope of this invention.

By using the present invention, the subatmospheric pressure in the tractor system connected with the manifold will be preserved and will be available as a source of power for operating the tractor brakes or other differential pressure tractor power units even though the trailer should become unhitched.

Although only one embodiment of the invention has been illustrated and described, various changes in the form and relative arrangements of the parts may be made to suit requirements.

I claim:

1. In a tractor-trailer braking system which includes a vacuum pressure source, a first trailer control valve connected with said source, a second trailer control valve for connecting vacuum pressure to said trailer brake, and a pressure actuated distributor valve having communication with said vacuum source, said first trailer valve, said second trailer valve and a trailer reservoir tank connected to said trailer valve, said distributor valve comprising a casing including a compartment at one end thereof, a diaphragm dividing the compartment into first and second variable volume chambers, said valve casing having a central bore and a reciprocable valve piston movable therein and connected to said diaphragm, said piston having spaced apart annular valve channels, a first port in said valve casing connecting a first channel with said first trailer control valve and a second port connecting the channel with said second trailer control valve, and the reservoir tank, a third port communicating with a second valve channel and connected to said reservoir tank and said first variable volume chamber, a fourth port connecting said second channel with the vacuum source and said second variable volume chamber by way of a relatively small passage within said casing, and a spring for urging said diaphragm in a direction to move said piston valve to establish open communication through said distributing valve when said diaphragm is opposed by equal vacuum in each of said first and second variable volume chambers.

2. A tractor-trailer braking system of the character designated in claim 1 wherein said relative small fluid passage is of smaller cross-sectional area than the passage leading to the first variable volume chamber to cause a predetermined rate of movement of the valve piston.

3. A valve for a tractor-trailer braking system, said valve comprising a casing having a compartment in one end thereof, a fluid pressure responsive member dividing said compartment into first and second variable volume chambers, a vacuum port communicating with the first chamber, said casing having first and second ports arranged to selectively communicate with each other, said casing also having third and fourth ports arranged to selectively communicate with each other, a first conduit member and a portion of a vacuum conduit together serving to connect said fourth port with said vacuum port, a valve mechanism carried by said casing and operatively secured to said fluid pressure responsive member, said valve mechanism controlling communication between said first and second ports and between said third and fourth ports, a resilient member arranged to urge said fluid pressure responsive member in a direction to establish the aforementioned communication between the respective ports, and a second conduit connecting said third port with said second chamber, said second conduit being smaller in cross-sectional area than said first conduit and vacuum conduit portion to provide a more restricted communication between said third port and said second chamber than that between said fourth port and said first chamber.

4. A valve for a tractor-trailer braking system, said valve comprising a casing having a compartment in one end thereof, a fluid pressure responsive member dividing said compartment into first and second variable volume chambers, a vacuum port communicating with the first chamber, said casing having inlet and outlet ports arranged to selectively communicate with each other, a first conduit and a section of a vacuum conduit together serving to connect said inlet port with said vacuum port, a valve mechanism carried by said casing and operatively secured to said fluid pressure responsive member, said valve mechanism controlling communication between said inlet and outlet ports, a resilient member arranged to urge said fluid pressure responsive member in a direction to establish the aforementioned communication between the respective ports, and a second conduit connecting said outlet port with said second chamber, said second conduit being smaller in cross-sectional area than said first conduit and the aforementioned vacuum conduit section to thereby provide a more restricted communication between said outlet port and said second chamber than that between said inlet port and said first chamber.

5. A valve for a tractor-trailer braking system, said valve comprising a casing having a compartment in one end thereof, a fluid pressure responsive member dividing said compartment into first and second variable volume chambers, a vacuum port communicating with the first chamber, said casing having inlet and outlet ports arranged to selectively communicate with each other, a first conduit and a portion of a vacuum conduit the two cooperating to connect said inlet port with said vacuum port, a valve mechanism carried by said casing and operatively secured to said fluid pressure responsive member, said valve mechanism controlling communication between said inlet and outlet ports, means yieldably urging said pressure responsive member in a direction to establish communication betwen said inlet and outlet ports, and a second conduit connecting said outlet port with said second chamber, said second conduit being smaller in cross-sectional area than said first conduit and aforementioned vacuum conduit portion to provide a more restricted communication between said outlet port and said second chamber than that between said inlet port and said first chamber.

References Cited in the file of this patent

UNITED STATES PATENTS

| | | |
|---|---|---|
| 1,973,326 | Besler | Sept. 11, 1934 |
| 2,171,190 | Polston | Aug. 29, 1939 |
| 2,333,775 | Gille | Nov. 9, 1943 |
| 2,359,508 | Bergstedt | Oct. 3, 1944 |
| 2,380,507 | Eaton | July 31, 1945 |
| 2,451,139 | Williams et al. | Oct. 12, 1948 |